3,389,127
PROCESS FOR THE MANUFACTURE OF
LINEAR POLYESTERS
Peter Paul Kresse, Augsburg, and Adolf Hartmann, Gessertshausen, Germany, assignors to Farbwerke Hoechst Aktiengesellschaft vormals Meister Lucius & Brüning, Frankfurt am Main, Germany, a corporation of Germany
No Drawing. Filed Aug. 28, 1962, Ser. No. 220,087
Claims priority, application Germany, Sept. 2, 1961, F 34,842
8 Claims. (Cl. 260—75)

The present invention relates to a process for the manufacture of linear fiber-forming polyesters of high molecular weight.

High molecular linear polyesters, especially polyesters of aromatic dicarboxylic acids, are very important in industry for the manufacture of fibers, filaments or films. They are produced by polycondensation of bifunctional carboxylic acids or the functional derivatives thereof with bifunctional hydroxyl compounds, especially of the aliphatic or hydroaromatic series. This reaction takes a satisfactory course only in the presence of small amounts of compounds acting as catalysts, for example heavy metal oxides such as the oxides of antimony, lead or bismuth. When esters of dicarboxylic acids are used as starting materials, as is usually the case, definite metal salts are required in order to react the esters with the bifunctional hydroxyl compounds with the separation of the readily volatile alcohol components. Such metal salts known as transesterification catalysts are, for example, the acetates of zinc, calcium, cadmium or manganese. Consequently, it is necessary to produce the polyesters on an industrial scale in the presence of two different catalysts, a satisfactory medium degree of polymerization being only obtained with the use of relatively high amounts of said catalysts. This necessity involves disadvantages such as discolorations of the polycondensates or poor thermal stability. Proposals have, therefore, been made for avoiding these drawbacks, for example by using monometal complex compounds of certain aliphatic ketones, such as acetylacetone, without obtaining, however, satisfactory results.

In all catalytic processes it is important that the active compounds act in an especially favorable manner on the components to be reacted. In the known production of linear polyesters there is obviously particularly important a partial solubility, which, however, in most cases can only be observed in the course of the condensation, is often incomplete and thus allows of a relatively slow polymerization only.

It has now been found that the aforesaid disadvantages can be avoided and linear fiber-forming polyesters can be prepared by using as catalysts for the transesterification and/or polycondensation complex compounds which are composed of aromatic radicals containing at least two adjacent functional groups, bivalent, cationically bound metal and anionically bound metal.

Complex compounds of this kind are prepared in known manner from aromatic compounds containing at least two adjacent functional groups, for example, in the manner set forth at page 329 of J. prakt. Chemie 4, page 329 (1956).

There are suitably used compounds containing a phenolic hydroxyl group and other functional groups, such as carboxyl, hydroxyl or aldehyde groups, at least one of which is in orthoposition to the phenolic hydroxyl group. Compounds of this kind are, for example, pyrocatechol, salicylic acid, salicyclic aldehyde, 1,2-dihydroxynaphthalene, and hydroxynaphthoic acid. Aromatic compounds which are adjacently substituted in different manner can likewise be used, for example $\alpha,\alpha'$-dihydroxydiphenyl and $\alpha,\alpha'$-dihydroxyfluorene in which the steric distribution of the functional groups permits the formation of complex compounds with metals. As cationically bound metals there can be used metals having the principal valency of 2, preferably magnesium, calcium, strontium, barium, zinc, cadmium, lead, manganese or cobalt. Suitable metals which are bound in the anion of the complex compound are metals having a more electronegative character, above all titanium and tin, and furthermore, boron, bismuth and arsenic.

As starting products for the manufacture of linear polyesters according to the invention there can be used all dicarboxylic acids and bifunctional hydroxyl compounds known for making such polymers, for example terephthalic acid, isophthalic acid, 4,4-diphenyldicarboxylic acid, sulfonyldibenzoic acid, adipic acid, sebacic acid, ethylene glycol, trimethylene glycol, tetramethylene glycol or 1,4-dimethylol-cyclohexane. The acids are preferably used in the form of their dimethylesters so that prior to the polycondensation a transesterification with the bifunctional hydroxyl group is necessary. It is likewise possible to use several dicarboxylic acid esters or several bifunctional hydroxyl compounds, in this case copolyesters being obtained.

The catalysts of the invention are characterized in that they have a high activity not only for the polycondensation but also for the preceding transesterification reaction. Consequently, in most cases very small amounts of the complex compounds are sufficient for obtaining, without further additions, valuable linear polyesters from a mixture of bifunctional esters and bifunctional hydroxyl compounds. Complex compounds that are especially active as catalysts are zinc-titanium-pyrocatechinate and manganese-tin-pyrocatechinate. These compounds are used in an amount of 0.001 to 0.05% by weight, calculated on the dicarboxylic acid ester used. In general about 0.01% by weight and less are sufficient for obtaining in a short period of time polyesters of high molecular weight which are not discolored and can be made into shaped articles having good utility properties. On account of the low proportion of catalyst in the final product, the condensation products have generally a better thermal stability than corresponding linear polyesters produced by known processes which often undergo degradation when subjected to prolonged heating. Therefore, the polyesters made by the method of the invention are easier to process and the structure obtained therefrom have a higher thermal stability.

A further advantage resides in the fact that when the condensation products are brightened with the commonly used organic phosphorus compounds, for example triphenyl phosphite, no reaction products of metal oxides, for example of antimony, lead or bismuth, are formed, so that a subsequent discoloration does not take place.

The following examples serve to illustrate the invention but they are not intended to limit it thereto, the parts being by weight unless otherwise stated.

Example 1

0.0048 gram of zinc-titanium pyrocatechinate was added to 48.5 grams of dimethyl terephthalate and 46.5 grams of ethylene glycol and the mixture was heated to 185° C. in a nitrogen atmosphere. The ester exchange reaction set in at once and was terminated after 3 hours.

In the course of 90 minutes the temperature was increased to 265° C. while stirring under a reduced pressure of 12 mm. of mercury whereby the main quantity of glycol distilled off. The mixture was then heated for 50 mintues at 285° C. under a reduced pressure of 0.2 mm. of mercury (oil pump). The polyester thus obtained was solid and colorless, it had a softening point of 259°

C. and a relative viscosity of 1.840 (as a 1% solution in o-chlorophenol at 25° C.).

Example 2

450 parts of dimethyl terephthalate and 432 parts of ethylene glycol were transesterified with 0.090 part of zinc-titanium pyrocatechinate with the addition of 0.125 part of triphenyl phosphite. The ester exchange reaction was terminated after 4 hours and the condensation was carried out as described in Example 1. Within the course of 45 minutes and under a pressure of 0.2 mm. of mercury, a light colored polycondensation product was obtained having a softening point of 260° C. and a relative viscosity of 1.806.

Example 3

50 parts of bis-hydroxyethyl terephthalate were subjected to polycondensation with 0.005 part of manganese-titanium pyrocatechinate as described in Example 1. In the course of 1 hour under a pressure of 0.2 mm. of mercury a light colored polyester was obtained having a softening point of 258° C. and a relative viscosity of 1.900.

Example 4

50 parts of bis-hydroxyethyl terephthalate were condensed with 0.005 part of zinc-titanium pyrocatechinate as described in Example 1. The reaction took 90 minutes (0.2 mm. of mercury). The colorless polycondensation product obtained had a softening point of 261° C. and a relative viscosity of 1.653.

Example 5

50 parts of bis-hydroxyethyl terephthalate and 0.005 part of magnesium-tin pyrocatechinate were heated under reduced pressure as described in Example 1. After having heated for 2 hours under a pressure of 0.2 mm. of mercury the condensation was terminated. A colorless polyester was obtained having a relative viscosity of 1.750 and a softening point of 260° C.

Example 6

50 parts of bis-hydroxyethyl terephthalate were mixed with 0.025 part of calcium-boron pyrocatechinate and the mixture was subjected to polycondensation as described in Example 1. After 90 minutes under a pressure of 0.2 mm. of mercury a colorless polyester was obtained having a relative viscosity of 1.728 and a softening point of 261° C.

Example 7

50 parts of bis-hydroxyethyl terephthalate and 0.005 part of cadmium-arsenic pyrocatechinate were subjected to a polycondensation as described in Example 1. After 1 hour under a pressure of 0.2 mm. of mercury a bright polyester was obtained having a softening point of 259° C. and a relative viscosity of 1.664.

Example 8

50 parts of bis-hydroxyethyl terephthalate and 0.005 part of lead-titanium salicylate were polycondensed as described in Example 1. After having heated for 90 minutes under a pressure of 0.2 mm. of mercury a bright polyester was obtained having a relative viscosity of 1.815 and a softening point of 257° C., from which polyester drawable filaments could be made.

Example 9

50 parts of bis-hydroxyethyl terephthalate were polycondensed with 0.005 part of zinc-titanium salicylate as described in Example 1. After 1 hour under a pressure of 0.2 mm. of mercury a colorless polyester was obtained which had a relative viscosity of 1.840 and a softening point of 259° C.

Example 10

50 parts of bis-hydroxyethyl terephthalate and 0.005 part of zinc-tin salicylate were mixed with one another and polycondensed as described in Example 1. After 2 hours a colorless polyester was obtained having a relative viscosity of 1.623 and a softening point of 260° C.

We claim:
1. In the process for the production of linear fiber-forming polyesters by the polycondensation of bifunctional hydroxyl compounds with dicarboxylic acid or by the transesterification of low molecular weight aliphatic esters of dicarboxylic acids with bifunctional hydroxyl compounds and polycondensation of the transesterification product the improvement comprising employing as a catalyst during at least one of the polycondensation and transesterfication of a complex compound formed of
   (a) an aromatic radical containing a hydroxyl group and adjacently substituted to said hydroxyl group a functional group selected from the class consisting of hydroxyl and carboxyl, the steric distribution of said hydroxyl and functional groups permitting the formation of complex compounds,
   (b) a metal selected from the group consisting of titanium, tin, boron, bismuth and arsenic anionically bound to the functional groups of the aromatic radical to form a complex anion and
   (c) a bivalent metal selected from the group consisting of magnesium, calcium, strontium, barium, zinc, cadmium, lead, manganese and cobalt cationically bound to the complex anion.

2. The process of claim 1 wherein the polyester is formed by the reaction of a dicarboxylic acid selected from the group consisting of terephthalic acid, isophthalic acid, 4,4-diphenyldicarboxylic acid, sulfonyldibenzoic acid, adipic acid and sebacic acid and a bifunctional hydroxyl compound selected from the group consisting of ethylene glycol, trimethylene glycol, tetramethylene glycol and 1,4-dimethylolcyclohexane.

3. The process of claim 1 wherein the polyester is formed by the reaction of a bifunctional hydroxyl compound selected from the group consisting of ethylene glycol, trimethylene glycol, tetramethylene glycol and 1,4-dimethylolcyclohexane and the lower molecular weight aliphatic ester of an acid selected from the group consisting of terephthalic acid, isophthalic acid, 4,4-diphenyldicarboxylic acid, sulfonyldibenzoic acid, adipic acid and sebacic acid.

4. The process of claim 1 wherein the complex compound is used as a catalyst for the transesterification.

5. The process of claim 1 wherein the complex compound is used as a catalyst for the polycondensation.

6. The process of claim 1 wherein the complex compound is zinc-titanium-pyrocatechinate.

7. The process of claim 1 wherein the complex compound is manganese-tin-pyrocatechinate.

8. The process of claim 1 wherein the polyester is formed by transesterifying dimethyl terephthalate with ethylene glycol and subsequently polycondensing the product so obtained.

References Cited

UNITED STATES PATENTS

| | | | |
|---|---|---|---|
| 2,681,360 | 6/1954 | Vodonik | 260—75 |
| 2,857,363 | 10/1958 | Easley et al. | 260—75 |
| 3,072,612 | 1/1963 | Pengilly | 260—75 |
| 3,073,801 | 1/1963 | Siggel et al. | 260—75 |
| 3,047,515 | 7/1962 | Piirma et al. | 260—75 |
| 3,057,826 | 10/1962 | Griffing | 260—75 |
| 3,058,948 | 10/1962 | Mosimann et al. | 260—75 |
| 3,245,959 | 12/1966 | Roeser | 260—75 |

FOREIGN PATENTS 945,853  1/1964  Great Britain.

WILLIAM H. SHORT, *Primary Examiner.*

L. P. QUAST, *Assistant Examiner.*